(No Model.) 2 Sheets—Sheet 2.
J. G. HODGSON.
MACHINE FOR CUTTING AND FORMING SHEET SOLDER RINGS.
No. 450,313. Patented Apr. 14, 1891.
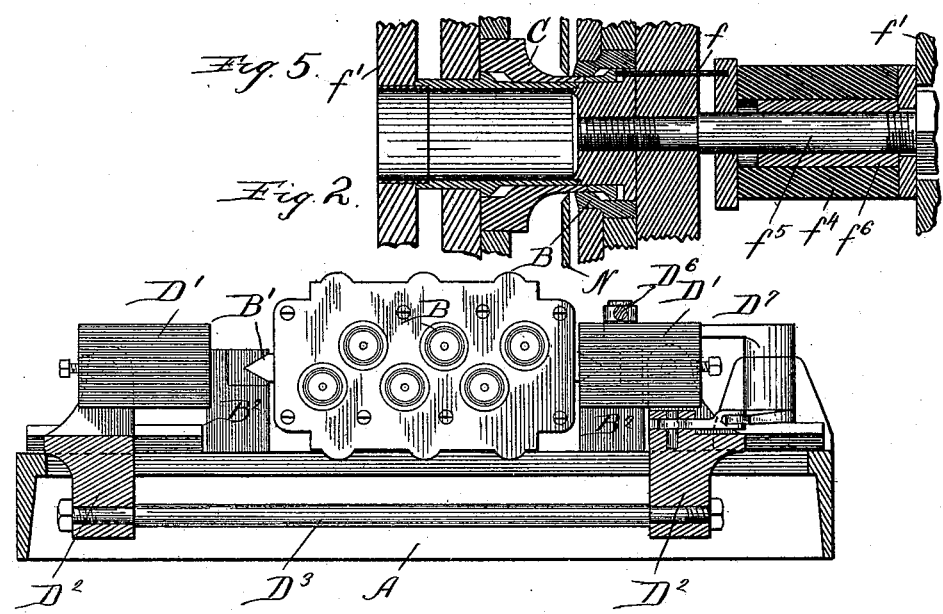
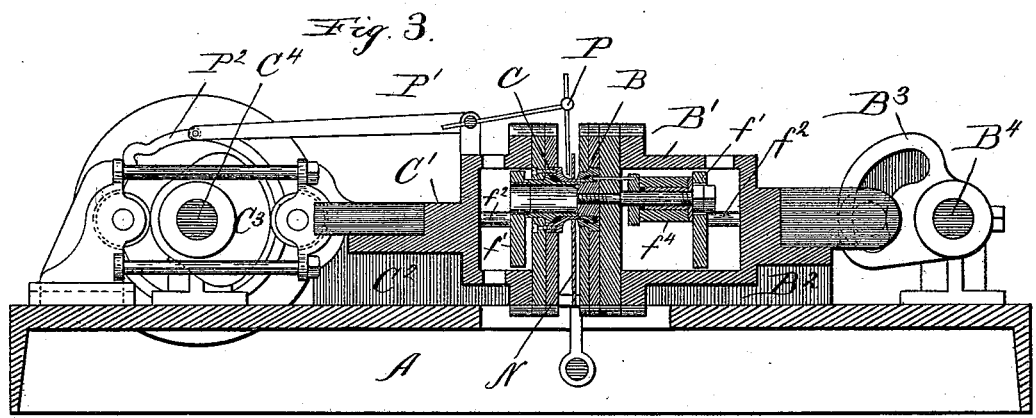
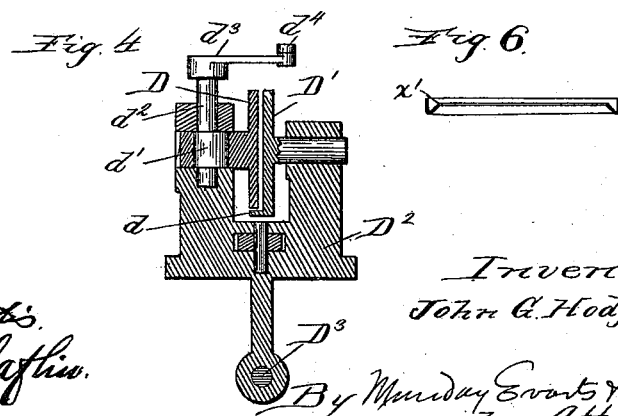
Witnesses:
Geo. E. Burts
Mack A. Claflin
Inventor:
John G. Hodgson
By Munday Evarts & Adcock
his Attorneys

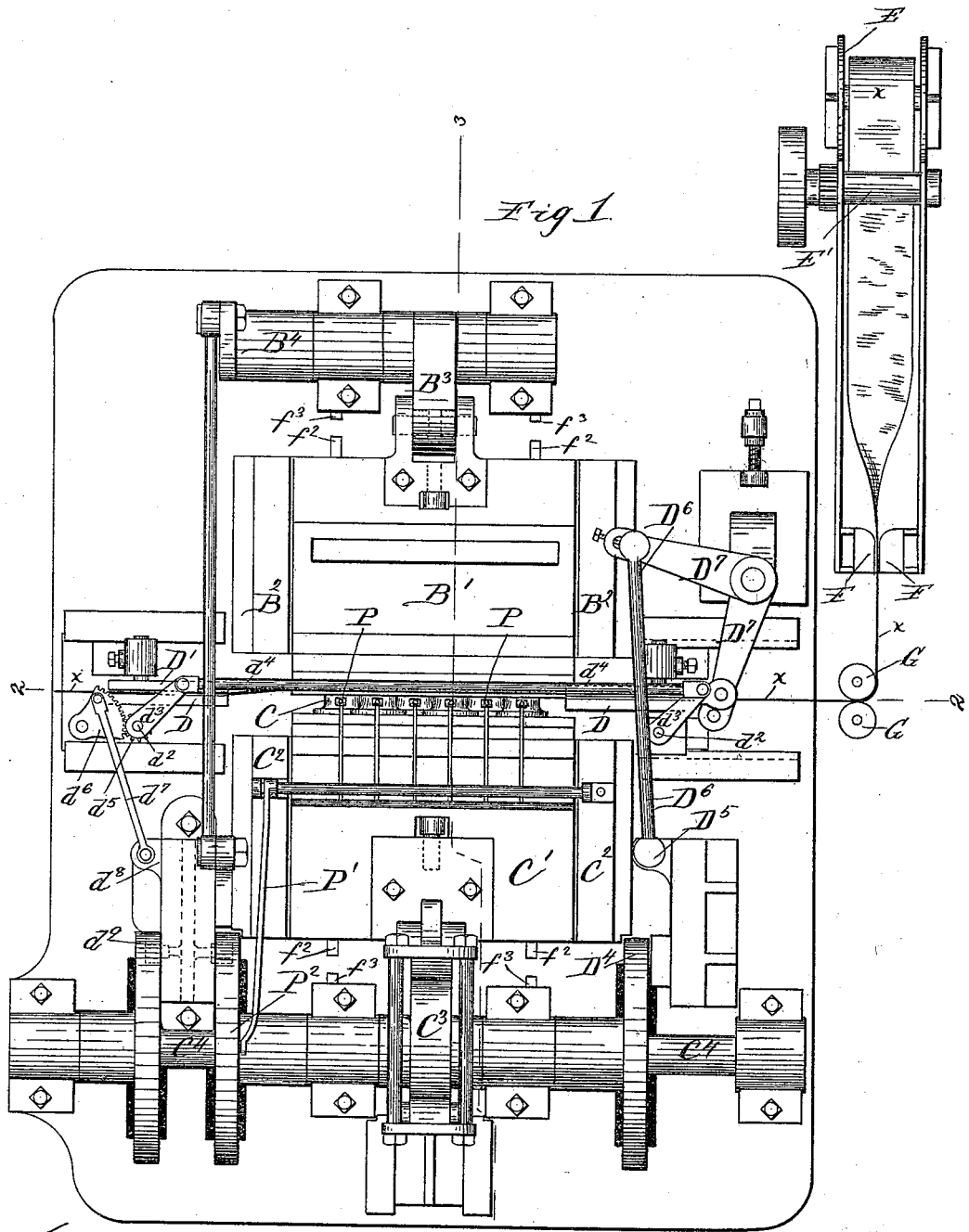

UNITED STATES PATENT OFFICE.

JOHN G. HODGSON, OF MAYWOOD, ILLINOIS, ASSIGNOR TO EDWIN NORTON, OF SAME PLACE, AND OLIVER W. NORTON, OF CHICAGO, ILLINOIS.

MACHINE FOR CUTTING AND FORMING SHEET-SOLDER RINGS.

SPECIFICATION forming part of Letters Patent No. 450,313, dated April 14, 1891.

Application filed October 31, 1888. Serial No. 289,645. (No model.)

*To all whom it may concern:*

Be it known that I, JOHN G. HODGSON, a citizen of the United States, residing in Maywood, in the county of Cook and State of Illinois, have invented a new and useful Improvement in Machines for Cutting and Forming Sheet-Solder Rings, of which the following is a specification.

Our invention relates to machines for making sheet-solder rings for can-caps, such as are shown and described in Patents Nos. 364,662 and 364,663, the rings being cut and formed by the machine from a continuous strip of sheet-solder, the manufacture of which is fully shown and described in Patents Nos. 382,319 and 382,321, of May 8, 1888.

The object of this invention is to provide a machine which will rapidly and cheaply cut and form such solder rings or other like articles.

Our invention consists in the combination, with a spool or reel for holding the continuous sheet-metal strip, of a pair of male and female dies for cutting and forming the rings from such strip and a feeder or device for automatically feeding the solder strip from its revolving spool or reel to the dies.

It further consists in the combination, with such dies, of a sheet-metal strip feeder or feed mechanism having feed jaws or devices to clamp and hold the strip on each side of the dies so that the sheet-metal strip may be stretched and maintained in the same straight line or plane as it is fed to the dies.

It further consists in the combination, with a gang or series of alternately-arranged male and female dies, of mechanism for feeding the sheet-metal strip positively to the dies, so that the alternate and uncut blanks in the strip will properly register with the alternately-arranged dies at the next stroke thereof.

It further consists in the combination, with two movable cross-heads having dies mounted thereon, of a sheet-metal feeder or feed device adapted to hold or support the sheet in position between the dies as they both approach to cut or form the same.

It further consists in the novel devices and novel combinations of parts and devices herein shown and described, and more particularly pointed out in the claims.

In the accompanying drawings, which form a part of this specification, and in which similar letters of reference indicate like parts, Figure 1 is a plan view of a machine embodying our invention. Fig. 2 is a section on line 2 2 of Fig. 1, showing one gang of the dies in front elevation. Fig. 3 is a vertical longitudinal section on line 3 3 of Fig. 1, and Fig. 4 is a detail vertical sectional view through one of the sheet-metal-strip feed-clamps, taken on line 4 4 of Fig. 1. Fig. 5 is an enlarged view of the dies, and Fig. 6 shows the solder ring as cut and formed by the dies.

In said drawings, A represents the frame of the machine.

B and C are the gangs of alternately-arranged male and female dies mounted on the horizontally-reciprocating cross heads or slides $B'$ and $C'$.

$B^2$ and $C^2$ are the guides on the frame of the machine, in which the slides $B'$ $C'$ are reciprocated by the cams $B^3$ $C^3$ on the shafts $B^4$ $C^4$.

D D' and D D' are the reciprocating feed-clamps by which the sheet-metal strip $x$ is automatically and positively fed to and supported between the gangs of dies B C, one pair of said feed-clamps being on each side of the dies. The feed-clamps are reciprocated automatically by the slides $D^2$ $D^2$, on which they are mounted, Figs. 2 and 4. The slides $D^2$ $D^2$ are connected together by a rod $D^3$, and they are reciprocated by a cam $D^4$, slide $D^5$, connecting-rod $D^6$, and bent lever $D^7$, Fig. 1. One of the feed-clamp jaws D' of each pair is or may be mounted rigidly on its reciprocating slide $D^2$. The other feed-clamp jaw D of each pair, however, is mounted movably, so as to open and close against the stationary jaw, and thus clamp the sheet-metal strip $x$ between them at intervals. One of the feed-clamps of each pair, preferably the one which is mounted immovably on its slide, is or should be furnished with a flange or ledge $d$, Fig. 4, for the lower edge of the sheet-metal strip $x$ to rest against, and thus guide and hold the strip in proper position vertically to register rightly with the dies. The movable clamp-jaw D of each pair is opened and closed by a cam $d'$ on the shaft $d^2$, which is furnished with a crank-arm $d^3$, the two crank-arms $d^3$ being connected by a rod $d^4$. One of the shafts $d^2$ is furnished with a gear $d^5$, and is operated automatically by a segment-gear $d^6$, which is actuated by the connecting-rod $d^7$ on the slide $d^8$. The slide $d^8$ is reciprocated by cams $d^9$.

The sheet-metal-strip feeder, which we prefer to combine with the dies and spool for automatically feeding the strip from the spool to the dies, preferably consists of the reciprocating clamps D D'; but our invention in its more generic features is not limited to a metal-strip feeder of this or any other particular construction.

E is the spool or reel for the sheet-metal strip $x$.

E' is a tension or friction roller which serves to prevent the sheet-metal strip from unwinding too fast from the reel, and in a measure to smooth and straighten it out.

F F are guide-jaws between which the strip passes, and by which it is turned from the horizontal plane of the spool E to the vertical plane of the feed-clamps D D'.

G G are guide-rollers for the strip $x$. The guide-rollers G G and the guides F F serve to flatten and straighten the strip and free it from kinks or indentations.

The gang-dies B C are arranged alternately with the space of one blank between each two consecutive dies, so that only the alternate blanks will be cut from the strip at each stroke of the cross-heads. The dies are arranged, preferably, three or other odd number in a row, or so that the feed device or mechanism may feed the strip or sheet the same distance longitudinally at each successive stroke. If there were an even number of dies in a row alternately arranged, in order to cause the uncut blanks in the strip to properly register with the dies, the feed mechanism would require to feed the strip an unequal distance at each two consecutive strokes. If there are an odd number of dies in a row, the feed mechanism should be arranged to feed the strip at each stroke a distance equal to the space required for the number of blanks cut at each stroke—that is to say, if there are three dies in a row, as shown in the drawings, the strip must be fed the distance equal to three times the diameter of one die. By thus employing an odd number of alternately-arranged dies in each row they combine with a sheet-feed mechanism, which makes the same stroke consecutively, and at the same time each and every die in the gang will cut a blank at every stroke and there will be no waste or blank spaces skipped in the sheet or strip, which latter would be the case if an even number of alternately-arranged dies in a row were combined with a feed mechanism which makes the same stroke consecutively.

Each of the female dies B is provided with the usual extractor-pin $f$, Fig. 5. The extractor pin $f$ is operated to eject the blank from the die as the cross-heads B C make their rearward stroke by striking against a stop. The extractor-pins $f$ for each die of the gang have a common operating-plate $f'$, the rod $f^2$ of which impinges against the fixed stop $f^3$, Fig. 1. Each extractor-pin $f$ is also furnished with a rubber buffer $f^4$, preferably of a cylindrical shape and surrounding the guide-pin $f^5$, which is rigidly secured to the die. Surrounding this guide-pin $f^5$ is also a metal sleeve $f^6$, so that in case the rubber compresses too far this metal sleeve may operate the extractor-pin. The central sleeve portion of the male dies C operates as the extractor, the same being actuated by the plate $f'$ and stop $f^3$.

Between the dies B C is a stripper-plate N, secured to the frame of the machine, which serves to strip the sheet $x$ from the male dies C as they are withdrawn. This stripper-plate also serves as a guide for the sheet or strip $x$.

P is a movable device or knocker to cause the ring $x'$ to drop from the male die C in case it should stick thereto. This knocker-pin is operated by a lever P' and cam P², Fig. 3. The knocker P is caused by its operating-cam to strike or impinge against the edge of the solder ring $x'$ in case it should stick to the male die C when the dies recede, and thus crowd the ring $x'$ off the die, so that it will drop down out of the way before the next stroke of the dies.

In operation, the strip of sheet metal being wound upon the spool E and its free end extended between the guide or smoothing blocks F F, guide-rollers G G, and feed-clamps D D' and D D', the clamps D D' and D D' are closed upon the metal strip, and then the feed-slides D² D² are reciprocated in the direction of the feed, thus feeding or moving the strip forward in position for the dies; and then the slides B' C', which carry the male and female dies B C, are forced together, causing the dies to cut a series of rings $x'$ from the sheet-metal strip $x$. The slides B' C' then recede, thus causing the ejector or extractor-pins $f$ to eject the ring $x'$ from the die. In case the ring $x'$ should adhere to the male die it will be pushed off the same by the knocker P, as before described. As the die-carrying slides B' C' recede from each other the feed-clamps D D' D D' open and the feed-slides D² also recede into position for the clamps D D' D D' to again grasp the sheet-metal strip and feed it forward for a new cut.

While my machine is specially designed for cutting and forming the sheet-solder ring shown in Fig. 6, the same may of course be used for other purposes by simply changing the dies.

I claim—

1. The combination, with a pair of reciprocating dies, of a sheet-metal-strip holding spool or reel and a sheet-metal-strip feeder for automatically feeding the strip from said spool to the dies, substantially as specified.

2. The combination, with a pair of reciprocating dies and a pair of reciprocating feeders on opposite sides of the dies, one operating upon the strip before it is cut or acted upon by the dies and the other after, substantially as specified.

3. The combination, with a pair of reciprocating dies, of two pairs of reciprocating feed-clamps, one pair on each side of the dies, and a stationary stripper-plate between the dies, substantially as specified.

4. The combination of a pair of opposing dies for operating upon a sheet with two movable cross-heads, upon which said dies are mounted, and a feeder for feeding and supporting the sheet between said dies, substantially as specified.

5. The combination, with two horizontal reciprocating cross-heads having dies mounted thereon for operating upon a sheet, of two pairs of feed clamps or devices, one on each side of the dies for feeding and supporting the sheet between the dies, substantially as specified.

6. The combination, with two horizontally-reciprocating cross-heads, of dies mounted thereon for operating upon the sheet, and supports, one on each side of the die, for supporting the sheet between them, substantially as specified.

7. The combination of two pairs of reciprocating cross-heads having each a gang of dies mounted thereon for operating upon a sheet, and a feeder for feeding and supporting the sheet between them, substantially as specified.

8. The combination, with a reciprocating cross-head having a gang of alternately-arranged male dies mounted thereon, of a second reciprocating cross-head having a corresponding gang of female dies mounted thereon, substantially as specified.

9. The combination, with a reciprocating cross-head having a gang of alternately-arranged male dies mounted thereon, of a second reciprocating cross-head having a corresponding gang of female dies mounted thereon, and two pairs of reciprocating feed-clamps, one on each side of said dies, substantially as specified.

10. The combination, with a reciprocating cross-head having a gang of alternately-arranged male dies mounted thereon, of a second reciprocating cross-head having a corresponding gang of female dies mounted thereon, two pairs of reciprocating feed-clamps, one on each side of said dies, and a spool or reel for the sheet-metal strip, substantially as specified.

11. The combination of a sheet-metal reel or spool, guide devices F F for smoothing, flattening, or straightening the sheet-metal strip as it passes between them, and a pair of reciprocating dies and a feeder for automatically feeding the strip from the reel or spool to the dies, substantially as specified.

12. The combination, with a gang of alternately-arranged male and female dies having an odd number of dies in each row, of a feeder for feeding the sheet to said dies along or in the direction of said rows of dies and the same distance at each stroke of the dies, substantially as specified.

13. The combination, with a reel or support for holding the continuous-sheet strip, of a smoothing and guiding device for the strip, gangs of alternately-arranged male and female dies having an odd number of dies in each row, and a feeder for automatically feeding the strip along or in the direction of said rows of dies an equal distance at each stroke thereof, substantially as specified.

14. The combination, with gangs of alternately-arranged male and female dies, of two pairs of reciprocating feed-clamps and mechanism for giving both pairs of said feed-clamps the same reciprocating movement consecutively in the direction of the rows of dies, there being an odd number of dies in each row, substantially as specified.

15. The combination, with a pair of horizontally-reciprocating dies, of a feeder for feeding the trip in a vertical plane between them, whereby the strip is prevented from resting upon or adhering to the dies, substantially as specified.

16. The combination, with a pair of horizontally-reciprocating dies, of a feeder for feeding the strip in a vertical plane between them to prevent the strip from resting upon or adhering to the dies, a spool for holding the sheet-strip, and guide devices for turning the strip from a horizontal to a vertical plane as it is fed, substantially as specified.

17. The combination, with the male die C, of a vibrating knocker P, adapted and arranged, substantially as shown and described, to strike against the edge of the ring cut by the dies, and mechanism for operating the same, substantially as specified.

18. The combination, with a pair of reciprocating dies, of a pair of reciprocating feed-clamps D D' for holding and feeding the sheet, substantially as specified.

19. The combination, with a pair of reciprocating dies, of a pair of reciprocating feed-clamps D D' for holding and feeding the sheet, one of said clamps having a guide-flange or ledge d; substantially as specified.

20. The combination, with a pair of reciprocating dies, of two pairs of reciprocating feed-clamps D D' D D' and mechanism for automatically opening and closing said clamps, substantially as specified.

21. The combination, with a pair of reciprocating dies, of a stripper-plate N between them, and a feeder for feeding the sheet to the dies, substantially as specified.

22. The combination, with a pair of horizontally-reciprocating dies, of a stationary stripper-plate between them, substantially as specified.

23. The combination, with a pair of horizontally-reciprocating dies, of a stationary stripper-plate between them, and a feeder for feeding the sheet between them, substantially as specified.

24. The combination, with gangs of alternately-arranged male and female dies, of two horizontally-reciprocating cross-heads upon which said dies are mounted, and a stripper-plate between them, substantially as specified.

25. The combination, with gangs of alternately-arranged male and female dies, of two horizontally-reciprocating cross-heads upon which said dies are mounted, and a stripper-plate between them, and a feeder for feeding a sheet-metal strip in a vertical plane between said dies, substantially as specified.

JOHN G. HODGSON.

Witnesses:
EDMUND ADCOCK,
JOHN W. MUNDAY.